(12) United States Patent
Kinch et al.

(10) Patent No.: US 9,788,479 B2
(45) Date of Patent: Oct. 17, 2017

(54) TIMING SYSTEM FOR SEEDER PRODUCT DELIVERY

(71) Applicant: SEEDMASTER MANUFACTURING LTD., Emerald Park (CA)

(72) Inventors: Owen Kinch, Emerald Park (CA); Norbert Beaujot, Emerald Park (CA); Timothy Ottenbreit, Emerald Park (CA)

(73) Assignee: SeedMaster Manufacturing, Ltd., Emerald Park, SK (CA)

(*) Notice: Subject to any disclaimer, the term of this patent is extended or adjusted under 35 U.S.C. 154(b) by 80 days.

(21) Appl. No.: 14/666,893

(22) Filed: Mar. 24, 2015

(65) Prior Publication Data

US 2015/0271989 A1    Oct. 1, 2015

(30) Foreign Application Priority Data

Mar. 25, 2014    (CA) .................................... 2847585

(51) Int. Cl.

| A01C 7/18 | (2006.01) |
|---|---|
| A01C 7/20 | (2006.01) |
| A01C 21/00 | (2006.01) |
| A01C 7/10 | (2006.01) |
| A01C 7/08 | (2006.01) |

(52) U.S. Cl.
CPC ............ *A01C 21/005* (2013.01); *A01C 7/102* (2013.01); *A01C 7/081* (2013.01); *A01C 7/105* (2013.01)

(58) Field of Classification Search
CPC ......... A01C 21/005; A01C 7/08; A01C 7/102; A01B 79/02
See application file for complete search history.

(56) References Cited

U.S. PATENT DOCUMENTS

| 7,555,990 | B2 | 7/2009 | Beaujot | |
|---|---|---|---|---|
| 8,434,416 | B2* | 5/2013 | Kowalchuk | A01C 7/126 111/178 |
| 8,473,168 | B2* | 6/2013 | Goldman | A01C 7/046 111/200 |
| 8,578,870 | B2 | 11/2013 | Beaujot | |
| 8,600,629 | B2* | 12/2013 | Zielke | A01B 79/005 111/200 |
| 8,948,976 | B1* | 2/2015 | Unruh | A01C 21/005 111/171 |
| 9,179,595 | B2* | 11/2015 | Kormann | A01C 21/005 |
| 9,237,687 | B2* | 1/2016 | Sauder | A01C 5/064 |

(Continued)

*Primary Examiner* — John G Weiss
(74) *Attorney, Agent, or Firm* — Nixon & Vanderhye P.C.

(57) ABSTRACT

A delay period timing system for a seeding implement with a feed control. A distribution network conveys products to the furrow openers, and a feeding mechanism controls flow of products into the distribution network. A flow sensor downstream from the feeding mechanism detects when products are flowing at a sensing location, and a timer measures a delay period between the time the feeding mechanism starts or stops flow and when the flow sensor starts or stops detecting flow. The delay period is adjusted to account for the location of the flow sensor. A method of determining the delay period includes determining the length of the distribution network and determining the speed of flow of the products. The system can be used on seeding implement with or without sectional control.

8 Claims, 3 Drawing Sheets

(56) References Cited

U.S. PATENT DOCUMENTS

| | | | |
|---|---|---|---|
| 2010/0131095 A1* | 5/2010 | Zielke | A01C 7/102 700/232 |
| 2010/0264163 A1* | 10/2010 | Tevs | A01C 7/081 222/1 |
| 2012/0279430 A1 | 11/2012 | Beaujot | |
| 2015/0112556 A1* | 4/2015 | Meyer zu Hoberge | A01C 7/105 701/50 |
| 2015/0216109 A1* | 8/2015 | Meyer | A01C 7/081 222/334 |
| 2015/0237795 A1* | 8/2015 | Koch | G01C 15/00 701/50 |

\* cited by examiner

TIMING SYSTEM FOR SEEDER PRODUCT DELIVERY

This application claims priority to Canada Application No. 2,847,585, filed on Mar. 25, 2014, the entire content of which is incorporated herein by reference.

This disclosure relates to the field of agricultural implements and in particular a seeding implement, such as an air seeder, which transfers agricultural products from a container to furrow openers of the implement.

BACKGROUND

Air seeders typically include an implement frame mounted on wheels, with a plurality of furrow openers mounted on the frame. The furrow openers can be moved from a raised non-operative position to a lowered operating position where the furrow openers engage the ground and create furrows. Agricultural products such as seed and various types of fertilizer are carried in separate tanks which can be mounted on the implement frame or on a cart towed along with the implement frame.

Metering devices dispense products from the tanks into one or more air streams that carry the products through a distribution network of hoses and manifolds to the furrow openers where same are deposited in the furrows. Most modern air seeders have furrow openers that deliver seed to seed furrows and fertilizer to separate fertilizer furrows. These may be totally separate furrow openers mounted on separate shanks, such as mid row fertilizer banding furrow openers which are remote from the seed furrow openers, or combination furrow opener where a single shank supports a furrow opening tool that makes one furrow for seed and a separate furrow for fertilizer. There are also then two separate distribution networks, one delivering product from selected tanks to the seed furrows, and one delivering product from selected tanks to the fertilizer furrows.

The terms "seed" and "fertilizer" are not meant restrictively, since in many cases some fertilizer is metered into the air stream carry the seed, and also in some instances it may be that fertilizer may be directed into the "seed" furrows, and vice versa if conditions warrant it. The terms "seed" and "fertilizer" are simply convenient to differentiate the two separate "runs" or air streams. Basically in an air seeder it is desirable to be able to direct agricultural product from any of the tanks into any of the available air streams. Similarly the term "seeded area" as used herein may refer to an area where any desired agricultural products have been applied.

In one type of distribution network for an air seeder, the air stream carries the product from a feeding mechanism through a primary hose to a manifold where the air stream and product is divided and directed into multiple secondary hoses connected to the manifold outlet ports which deliver the product to the furrow openers. In some distribution networks each secondary hose connects into a further manifold and the air stream is divided again into further final hoses leading to each furrow opener. In other air seeders each distribution network comprises simply a conduit that leads directly from a feeding mechanism to each furrow opener. In all such air seeders there is a delay period between the time when the feeding mechanism starts to feed product into the distribution network and the time when the product arrives at the furrow openers. In addition the delay period is not the same for all furrow openers because the delivery network is longer for some furrow openers, for example furrow openers on outer ends of the implement, than for others, such as those closer to the middle of the implement.

When a seeding implement is operated in a field it is necessary to stop the product application from time to time, such as when turning at headlands, to avoid double application of product, commonly referred to as overlap. When moving the implement back toward an unseeded field area, the application must be started again. When it is desired to apply product, the feeding mechanism is activated to dispense product into the input end of the distribution network where the air stream carries it to the furrow openers. There is a start delay period between the time the feeding mechanism starts dispensing and the time the product reaches the furrow openers. Similarly when it is desired to stop applying product, the feeding mechanism is deactivated and stops dispensing product into the distribution network, however the product already in the distribution network continues to flow to the furrow openers and there is a stop delay period between the time the feeding mechanism stops dispensing and the time the last of the product reaches the furrow openers and product placement in the furrows stops.

The delay periods can vary significantly with different types of product and product volumes, velocity of the air stream, and like factors, and so should be reset when these factors are changed for different crops, fertilizer rates, and the like.

These delay periods are determined generally by timing the period between starting or stopping the feeding mechanism and seeing product flow at the furrow openers on the implement start or stop. In conventional operations the operator will estimate the point at which the feeding mechanism should be turned off when approaching a headland, or turned on when moving from a seeded to an unseeded area.

In modern operations computerized external guidance systems, using global positioning satellites (GPS) or more localized broadcasting towers or the like, determine the air seeder location, map the field, and determine where overlap areas will occur, and start and stop the supply of products to the furrow openers accordingly. The delay period is then entered into the external guidance system which determines the field locations where the feeding mechanism is turned on or off by calculating the distance travelled during the delay time. Because of the irregular pattern of many fields, and the unequal lengths of the distribution networks, an added safety factor is usually used to ensure against missing product application on any field areas where same is desired.

In conventional air seeders product application is started and stopped across the entire width of the implement, and the feeding mechanism is generally a metering device dispensing product from tanks. In order to reduce overlap in wide air seeders it is desirable to be able to shut off the supply of product to laterally distinct sections of the air seeder, as described generally in U.S. Pat. No. 8,578,870 to the present inventor Beaujot, the contents of which is hereby incorporated by reference. These sectional control systems use a computerized external guidance system to start and stop the supply of products to each section accordingly. Control of the flow of product into separate section distribution networks connected to each section can be provided by various feeding mechanisms such as manifold valves, gated meters, individual metering devices for each section, and the like as are known in the art.

In one example of sectional control, the furrow openers in a laterally distinct section of the air seeder are fed product by a single manifold. At all times during operation an air stream flows through the primary conduit from the metering device to the manifold and from the manifold through the secondary conduits to the furrow openers.

Each manifold is fed product by a separate metering device, such as for example is disclosed in United States Published Patent Application Number 2012/0279430 of the present inventor Beaujot. When it is desired to apply product to the section, the metering device is activated to dispense product into the air stream where it is carried to the manifold and then to the furrow openers.

In other systems, for example as disclosed in U.S. Pat. No. 7,555,990 to Beaujot, the feeding mechanism is a manifold with valves on the output ports which are opened and closed to start and stop product flow to the furrow openers, and the delay time occurs between the time the valve feeding product to a section is opened or closed, and the time product flow starts or stops at the furrow openers.

Thus when setting up a computer controlled sectional control system it is necessary to set start and stop delay periods in the system for each section to avoid overlap and areas where product application is missed. When the guidance system determines that a section must start or stop dispensing at a certain location, it must start or stop the feeding mechanism before the furrow openers reach that location to account for the start and stop delay periods. Currently these delay periods are set generally by timing the period between starting or stopping the meter and seeing product flow at the furrow openers in the section start or stop. Setting the delay periods is complicated by the fact that some sections will be farther from the feeding mechanisms than others due to the configuration of the distribution networks.

SUMMARY OF THE INVENTION

The present disclosure provides a delay timing system for a seeding implement that overcomes problems in the prior art.

In a first embodiment the present disclosure provides a delay period timing system for a seeding implement. The system comprises a plurality of furrow openers laterally spaced across an implement frame, and a distribution network configured to convey agricultural products from an input end of the distribution network to the furrow openers. A feeding mechanism is operative to start and stop a flow of agricultural products into the input end of the distribution network and a feed control is operative to activate the feeding mechanism. A flow sensor located at a sensing location in the distribution network is operative to detect when agricultural products are flowing in the distribution network at the sensing location and a timer is operative to measure a delay period being one of a start delay period and a stop delay period. The start delay period is equal to a period of time between a feed start time, when the feeding mechanism starts the flow of agricultural products into the input end of the distribution network, and a flow start time, when the flow of agricultural products starts being detected by the flow sensor, and the stop delay period is equal to a period of time between a feed stop time, when the feeding mechanism stops the flow of agricultural products into the input end of the distribution network, and a flow stop time, when the flow of agricultural products stops being detected by the flow sensor.

In a second embodiment the present disclosure provides a method of determining a delay period for a seeding implement with a plurality of furrow openers laterally spaced across an implement frame, the seeding implement comprising a distribution network configured to convey agricultural products from an input end of the distribution network to the furrow openers, a feeding mechanism operative to start and stop a flow of agricultural products into the input end of the distribution network, and a feed control operative to activate the feeding mechanism. The method comprises determining a length of the distribution network from the input end thereof to the furrow openers, determining a speed of the flow of agricultural products through the distribution network, and calculating the delay period for the distribution network as the time required for agricultural products to travel the length of the distribution network from the input end of the distribution network to the furrow openers at the speed of flow.

The present disclosure provides an accurate delay period for seeding implements with or without sectional control so that overlap and double seeding as well as misses where no product is applied are minimized. The delay period can be readily adjusted either manually or automatically when the agricultural product being applied or the application rate changes.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
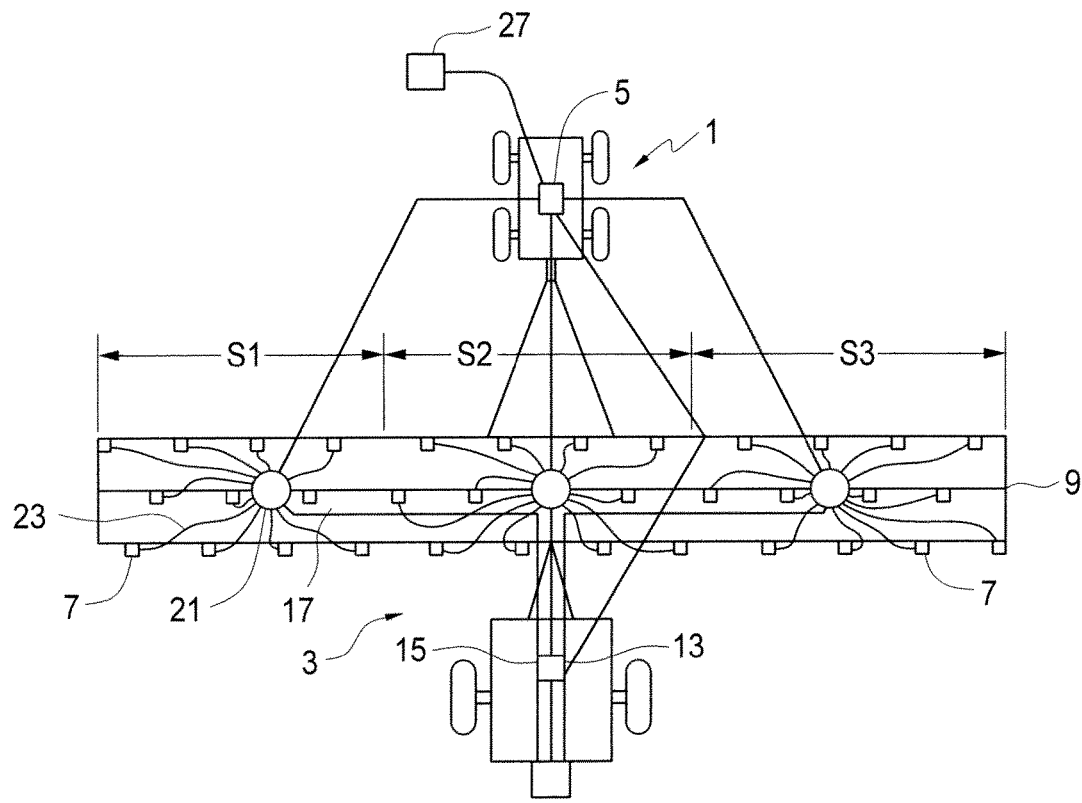
FIG. 1 is a schematic top view of an air seeder with an embodiment of a delay period timing system of the present disclosure installed thereon.
Figure 2:
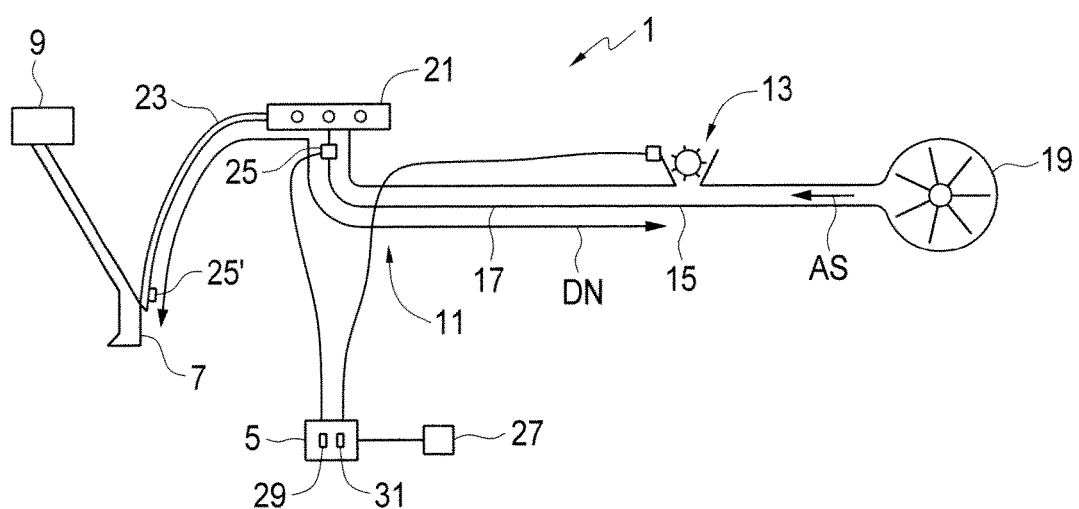
FIG. 2 is a side view of the delay period timing system installed on the air seeder of FIG. 1.

FIGS. 1 and 2 schematically illustrate an embodiment of a delay period timing system 1 of the present disclosure for a seeding implement 3 with a feed control 5 for controlling the supply of agricultural products to a plurality of furrow openers 7 laterally spaced across an implement frame 9. In the illustrated system 1 the furrow openers 7 are divided into sections designated generally S1, S2, S3 of laterally adjacent furrow openers 7, each section connected to a corresponding section distribution network 11. Each section distribution network 11 is configured to convey agricultural products from an input end of the section distribution network to a section of furrow openers 7, and each section of furrow openers 7 comprises a plurality of laterally adjacent furrow openers 7. For each section distribution network 11, a feeding mechanism 13 is operative to start and stop a flow of agricultural products into the input end 15 of the section distribution network, and the sectional control 5 is operative to activate each feeding mechanism 13 individually.

In applications where the implement 3 does not have sectional control, where each section may be turned on or off independently of the others, the number of sections will be one, with a single section distribution network 11 fed by a single feeding mechanism 13. The following description is directed to a seeding implement 3 with sectional control.

Thus the feed control 5 can be used to start and stop delivery to any of the sections of furrow openers as S1, S2, S3 so that if one of the sections is in a previously seeded field area, delivery of agricultural products to the furrow openers in that section can be stopped and then started again when the section moves into an unseeded field area.

In the system 1 illustrated in FIGS. 1 and 2 the section distribution networks 11 each comprise a primary conduit 17 with an input end 15 located just under the feeding mechanism 13, a manifold 21 and secondary conduits 23. The feeding mechanism 13 is schematically illustrated as a metering device connected to and controlled by the feed control 5. A fan 19 directs an air stream AS into the input end 15 of the primary conduit 17 and through the primary conduit 17 to the manifold 21 where the air stream, and any agricultural products entrained in the air stream, are directed into a plurality of secondary conduits 23 each of which ends at a furrow opener 7.

A flow sensor 25 is connected to the feed control 5 and is located at a sensing location in each section distribution network 11 and the flow sensor 25 is operative to detect when agricultural products are flowing in the section distribution network 11 at the sensing location.

A timer 27 is connected to the feed control 5 and is operative to measure a delay period for each section of furrow openers, the delay period being one of a start delay period and a stop delay period. The start delay period is equal to a period of time between a feed start time, when the feeding mechanism 13 starts the flow of agricultural products into the input end 15 of the section distribution network 11, and a flow start time, when the flow of agricultural products starts being detected by the flow sensor 25. Similarly the stop delay period is equal to a period of time between a feed stop time, when the feeding mechanism 13 stops the flow of agricultural products into the input end 15 of the section distribution network 11, and a flow stop time, when the flow of agricultural products stops being detected by the flow sensor 25.

In operation there will often be at least some hesitation between the time the feeding mechanism is started or stopped and the time product actually starts or stops flowing from the mechanism. With some metering devices, for example those with recesses in a roller, once stopped product continues to flow until the recesses that are exposed to the discharge are empty, and then once started the roller must turn to expose a filled recess to the discharge. The measured delay period will include this hesitation, whether being the start or stop delay period and so these stop and start delay periods for most practical purposes can be considered to be substantially the same, and either could be used to provide the required delay period.

The delay periods will vary considerably depending on the product, and the volume of product, being carried in the air stream. With light weight, low volume products, such as canola seed, the air stream is moving much slower than with high weight high volume products such as pea seeds or fertilizer.

In a typical application, the feed control 5 comprises an external guidance system, using GPS, radio towers, or the like to determine implement speed, to indicate a location of the implement 3 in a field, and to map the field such that the feed control 5 starts and stops the feeding mechanisms to substantially avoid overlapping previously seeded field areas. The field locations where each feeding mechanism 13 is started and stopped are determined by calculating a distance travelled by the implement 3 at the implement speed during the delay period for a corresponding section of furrow openers 7.

In the system 1 schematically illustrated in FIGS. 1 and 2 the sensing locations are at a middle portion of each section distribution network 11 just before the manifolds 21 and are somewhat removed from the furrow openers 7. In such a case the field locations where each feeding mechanism 13 is started and stopped are determined by calculating the distance travelled by the implement 3 during the delay period for a corresponding section of furrow openers 7, and by adding an adjustment time period to compensate for a distance from the sensing location to the furrow openers 7. As seen in the top view of FIG. 1 the distance between the manifold 21 and the furrow openers 7 in each section of furrow openers varies and generally some average distance will be used, with a safety factor period.

As the delay period varies with different products and flow rates, the relationship between this adjustment period and the delay period will remain proportional for each section. For example if the delay period is four seconds and the adjustment period is two seconds, the ratio of the delay period to the adjustment period is 2:1, and if a product or rate change causes the delay period to increase to six seconds, the adjustment period will become three seconds. Thus this ratio can be programmed into the feed control 5 to determine the field locations where the feeding mechanism 13 is started and stopped as the delay period varies.

In the implement of FIG. 1 product flow out of the manifold 21 will stop at a given time T1, but product that is present in the secondary conduits 23 will continue to flow until the secondary conduit is empty. Thus product flow out of a furrow opener 7 connected to a shorter secondary conduit 23 will stop somewhat after T1 at a time T2, and product flow out of a furrow opener 7 connected to a longer secondary conduit 23 will stop at a still later time T3.

Similarly when product flow is started again, product flow out of the manifold 21 will start at a given time T1, but the product must travel varying distances through the secondary conduits 23 to reach the furrow openers 7. Thus product flow out of a furrow opener 7 connected to a shorter secondary conduit 23 will start shortly after T1 at a time T2, and product flow out of a furrow opener 7 connected to a longer secondary conduit 23 will stop at a still later time T3.

In agricultural operations it is desired to minimize overlap areas where product is applied twice, but also to avoid missed areas where no product is applied. The safety factor period is added to ensure that all furrow openers are in an unseeded overlap area before flow to any one of the furrow openers stops, and to ensure that product is flowing to all furrow openers before any furrow opener moves out of the overlap area into an unseeded area. Where the product is moving at a slower speed, the safety factor period will be longer to provide more time for the slow moving product to reach the furrow openers, and if desired the safety factor period could be shortened when apply faster moving products. The safety factor can be changed using a manual safety factor input device 29.

FIG. 2 also schematically illustrates a flow sensor 25' placed at a sensing location that is in close proximity to one of the furrow openers 7. The adjustment time period to compensate for a distance from the sensing location to the furrow openers 7 in such an arrangement would be negligible, however some safety factor period would still be required to ensure that there were no missed areas.

The delay times can be determined prior to field operations and entered into the feed control 5 with a manual delay period input device 31. The manual delay period input device 31 can also be operative to set the delay period at a selected duration if desired. The delay periods can be determined automatically when one of the feeding mechanisms 13 starts or stops and if required, adjustments can be made accordingly.

As discussed above, it is contemplated that for the purposes of the presently disclosed system the start and stop delay times will be substantially the same, however the timer can also be operative to measure both the start delay period and the stop delay period and field locations where each feeding mechanism 13 is started are determined by calculating a distance travelled by the implement 3 during the start delay period for a corresponding section of furrow openers 7 and field locations where each feeding mechanism 13 is stopped are determined by calculating a distance travelled by the implement 3 during the stop delay period for a corresponding section of furrow openers 7.

Figure 3:
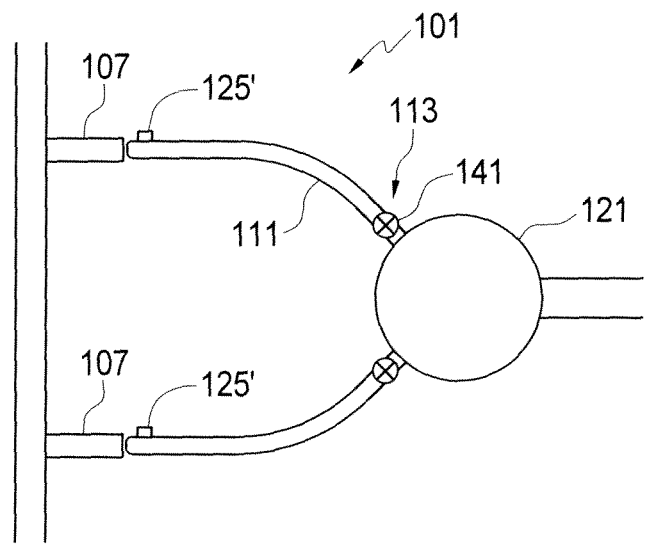
FIG. 3 is a schematic top view of the section distribution network and feeding mechanism of an alternate embodiment of a delay period timing system of the present disclosure where the feeding mechanism is a valve on a manifold that feeds directly to each furrow opener.

FIG. 3 schematically illustrates an alternate system 101 of the present disclosure where the feeding mechanism 113 stops and starts the flow of agricultural products through the section distribution network 111 by opening and closing a valve 141 on the manifold 121. The section distribution network 111 here is simply the secondary conduit shown in FIG. 1 with the input end 115 at the valve 141, and the furrow opener 107 at the other end, and the flow sensor 125' located in proximity to the furrow opener 107. The delay period here will be quite short, simply the time to travel from the valve 141 to the furrow opener 107. Each "section" in this version would be a single furrow opener 107, as each furrow opener is fed by a separate feeding mechanism 113 provided by the valve 141.

Figure 4:
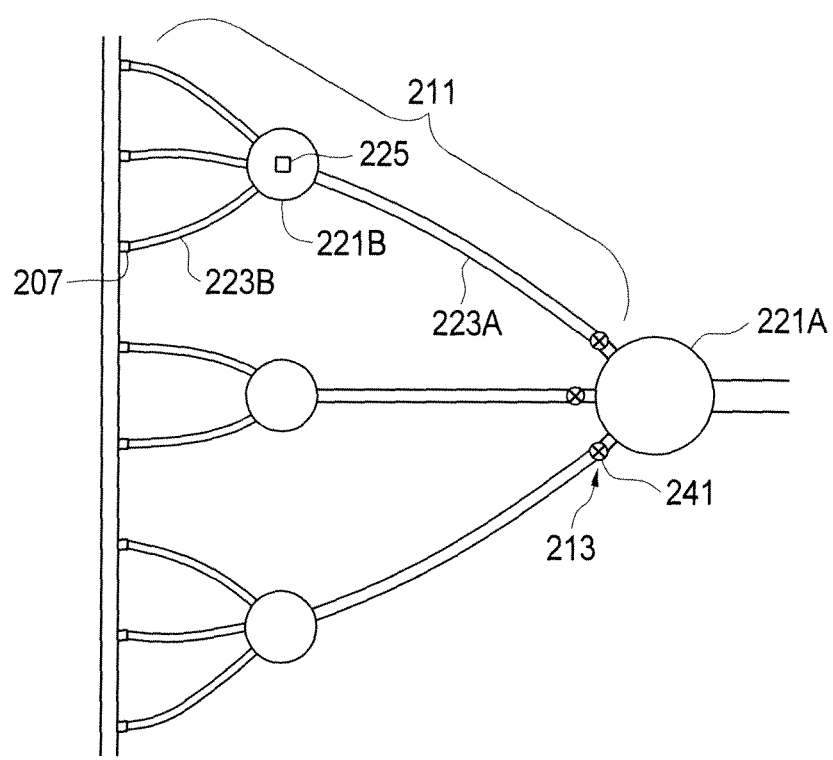
FIG. 4 is a schematic top view of the section distribution network and feeding mechanism of a further alternate embodiment of a delay period timing system of the present disclosure where the feeding mechanism is a valve on a primary manifold that feeds a secondary manifold which in turn feeds to each furrow opener directly to each furrow opener.

FIG. 4 schematically illustrates another alternate system 201 of the present disclosure where a primary conduit carries a flow of agricultural products to a first manifold 221A where the flow is divided into flows through secondary conduits 223A to downstream second manifolds 221B which in turn divide the flow into tertiary conduits 223B each of which ends at a furrow opener 207. In this system 201 each section distribution network 211 is provided by the secondary conduits 223A, second manifolds 221B and tertiary conduits 223B The feeding mechanism 213 is provided again by a valve 241 on the first manifold 221A, and the flow sensor is located at the second manifold 221B similarly to the flow sensor in the system 1 shown in FIGS. 1 and 2. The input end 215 of each section distribution network 211 is connected to a valve 241 on the first manifold 221A.

Figure 5:
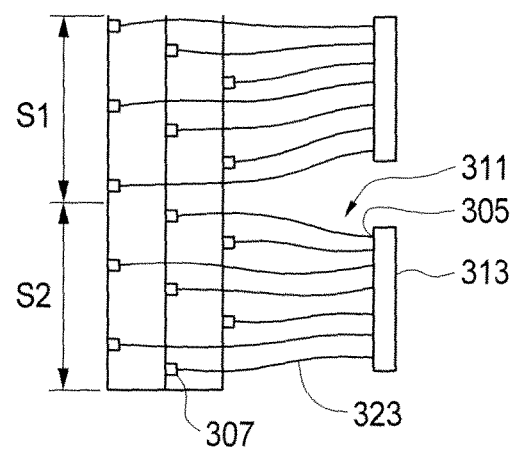
FIG. 5 is a schematic top view of the section distribution network and feeding mechanism of a further alternate embodiment of a delay period timing system of the present disclosure where the feeding mechanism is a metering box with a secondary conduit connecting the metering box directly to each furrow opener, and wherein metering box is controlled by the feed control.

FIG. 5 schematically illustrates another alternate system 301 of the present disclosure where the feeding mechanism 313 is provided by a metering box for each section S1, S2 of furrow openers. The metering box dispenses agricultural products directly into the input end of each of a plurality of secondary conduits 323, such that the section distribution network 311 comprises the plurality of secondary conduits connecting the metering box to each furrow opener 307, and the input end 305 of the section distribution network 311 is provided by the input ends of the secondary conduits 323.

The present disclosure provides a method of determining a delay period for a seeding implement 3 with a feed control 5 and a plurality of furrow openers 7 laterally spaced across an implement frame 9. The seeding implement 3 comprises a plurality of section distribution networks 11, each section distribution network 11 configured to convey agricultural products from an input end 15 of the section distribution network 11 to a section S1, S2, S3 of furrow openers 7, each section of furrow openers comprising a plurality of laterally adjacent furrow openers 7. For each section distribution network 11, a feeding mechanism 13 is operative to start and stop a flow of agricultural products into the input end 15 of the section distribution network 11, and the feed control 5 is operative to activate each feeding mechanism 13 individually.

The method comprises determining a length DN of each section distribution network 11 from the input end 15 thereof to the furrow openers 7 as schematically illustrated in FIG. 2, determining a speed of the flow of agricultural products through at least one of the section distribution networks 11, and calculating the delay period for each section distribution network 11 as the time required for agricultural products to travel the length of each section distribution network 11 from the input end of the section distribution network 11 to the furrow openers 7 at the speed of flow. As the distance from the input end 15 to the furrow openers will vary somewhat for each furrow opener, and average distance will usually be selected, or the longest distance may be used.

The feed control 5 typically comprises an external guidance system operative to determine implement speed, to indicate a location of the implement 3 in a field, and to map the field, and the method comprises avoiding overlapping previously seeded field areas by determining field locations where the feed control 5 starts and stops the feeding mechanisms 13 by calculating a distance travelled by the implement 3 during the delay period at the implement speed.

The method can comprise determining the speed of the flow of agricultural products by connecting the feed control 5 to a flow sensor 25 located at a sensing location in the at least one distribution network 11, where the flow sensor 25 is operative to detect when agricultural products are flowing in the distribution network at the sensing location, determining a distance between the feeding mechanism 13 and the sensing location, and determining a travel period being one of a start travel period and a stop travel period. The start travel period is equal to a period of time between a feed start time, when the feeding mechanism 13 starts the flow of agricultural products into the input end 15 of the section distribution network 11, and a flow start time, when the flow of agricultural products starts being detected by the flow sensor 25. The stop travel period is equal to a period of time between a feed stop time, when the feeding mechanism 13 stops the flow of agricultural products into the input end 15 of the section distribution network 11, and a flow stop time, when the flow of agricultural products stops being detected by the flow sensor 25.

Figure 6:
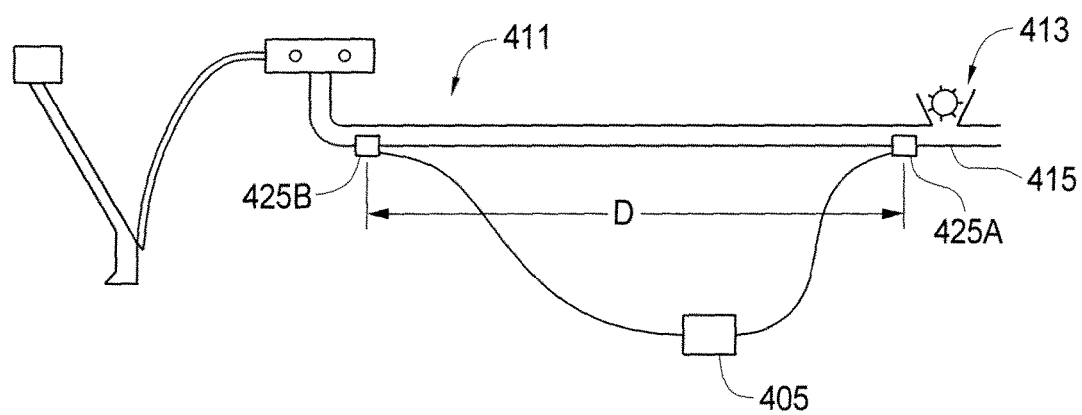
FIG. 6 is a schematic side view of a product flow speed measuring system for use with a method of the present disclosure.

The method can also comprising determining the speed of the flow of agricultural products by connecting the feed control 405 to first and second flow sensors 425A, 425B located at corresponding first and second sensing locations in the distribution network 411 as schematically illustrated in FIG. 6 and measuring a distance D between the first and second sensing locations, and measuring a travel period being one of a start travel period and a stop travel period. The start travel period is equal to a period of time between when product flow is sensed at the first and second sensing locations after the feeding mechanism 413 starts the flow of agricultural products into the input end 415 of the section distribution network 411, and wherein the stop travel period is equal to a period of time between when product flow stops being sensed at the first and second sensing locations after the feeding mechanism 413 stops the flow of agricultural products into the input end 415 of the section distribution network 411.

The present disclosure thus provides an accurate delay period that ensures minimal overlap without missing. The delay period can be readily adjusted either manually or automatically when the agricultural product being applied or the application rate changes.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method of determining a delay period for a seeding implement with a plurality of furrow openers laterally spaced across an implement frame, the seeding implement comprising a distribution network configured to convey agricultural products from an input end of the distribution network to the furrow openers, a feeding mechanism operative to start and stop a flow of agricultural products into the input end of the distribution network, and a feed control operative to activate the feeding mechanism, the method comprising:
   determining a length of the distribution network from the input end thereof to the furrow openers;
   determining a speed of the flow of agricultural products through the distribution network;
   calculating the delay period for the distribution network as the time required for agricultural products to travel the length of the distribution network from the input end of the distribution network to the furrow openers at the speed of flow; and
   wherein the feed control comprises an implement speed sensor and an external guidance system operative to indicate a location of the implement in a field and to map the field, and avoiding overlapping previously seeded field areas by determining field locations where the feed control starts and stops the feeding mechanism by calculating a distance travelled by the implement during the delay period at an implement speed.

2. The method of claim 1 comprising determining the speed of the flow of agricultural products by connecting the feed control to a flow sensor located at a sensing location in the distribution network, the flow sensor operative to detect when agricultural products are flowing in the distribution network at the sensing location, determining a distance between the feeding mechanism and the sensing location, and determining a travel period being one of a start travel period and a stop travel period; wherein the start travel period is equal to a period of time between a feed start time, when the feeding mechanism starts the flow of agricultural products into the input end of the distribution network, and a flow start time, when the flow of agricultural products starts being detected by the flow sensor; and wherein the stop travel period is equal to a period of time between a feed stop time, when the feeding mechanism stops the flow of agricultural products into the input end of the distribution network, and a flow stop time, when the flow of agricultural products stops being detected by the flow sensor.

3. The method of claim 1, comprising determining the speed of the flow of agricultural products by connecting the feed control to first and second flow sensors located at corresponding first and second sensing locations in the distribution network, measuring a distance between the first and second sensing locations, and measuring a travel period being one of a start travel period and a stop travel period; wherein the start travel period is equal to a period of time between when product flow is sensed at the first and second sensing locations after the feeding mechanism starts the flow of agricultural products into the input end of the distribution network, and wherein the stop travel period is equal to a period of time between when product flow stops being sensed at the first and second sensing locations after the feeding mechanism stops the flow of agricultural products into the input end of the distribution network.

4. The method of claim 1 wherein the field locations where the feeding mechanism is started or stopped are determined by calculating the distance travelled by the implement during the delay period and by adding a safety factor period.

5. The method of claim 1 comprising determining the delay time prior to field operations and entering the delay time into the feed control with a manual delay period input device.

6. The method of claim 5 wherein the manual delay period input device is operative to set the delay period at a selected duration.

7. The method of claim 1 wherein the delay times are determined automatically when the feeding mechanism starts or stops and adjusted accordingly.

8. The method of claim 1 wherein:
   the seeding implement comprises a plurality of section distribution networks, each section distribution network configured to convey agricultural products from an input end of the section distribution network to a section of furrow openers, each section of furrow openers comprising a plurality of laterally adjacent furrow openers, and for each section distribution network, a feeding mechanism operative to start and stop a flow of agricultural products into the input end of the section distribution network;
   the feed control is operative to activate each feeding mechanism individually;
   determining a length of each section distribution network from the input end thereof to the furrow openers;
   determining a speed of the flow of agricultural products through at least one section distribution network;
   calculating the delay period for each section distribution network as the time required for agricultural products to travel the length of each section distribution network from the input end of the section distribution network to the furrow openers at the speed of flow.

* * * * *